US007696436B2

(12) United States Patent
Tanaka

(10) Patent No.: US 7,696,436 B2
(45) Date of Patent: Apr. 13, 2010

(54) MULTI-COAXIAL CABLE ASSEMBLY AND MANUFACTURING METHOD OF THE SAME

(75) Inventor: Kotaro Tanaka, Naka-gun (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 12/269,171

(22) Filed: Nov. 12, 2008

(65) Prior Publication Data

US 2009/0120662 A1 May 14, 2009

(30) Foreign Application Priority Data

Nov. 14, 2007 (JP) ............................ 2007-295126

(51) Int. Cl.
*H02G 15/02* (2006.01)

(52) U.S. Cl. ..................... 174/74 R; 174/78; 174/84 R; 174/88 R; 174/88 C

(58) Field of Classification Search ............... 174/74 R, 174/84 R, 88 R, 88 C, 117 R, 117 F; 29/825, 29/283, 564.4, 861, 867, 827, 828, 33 M, 29/331
See application file for complete search history.

(56) References Cited

U.S. PATENT DOCUMENTS 4,365,856 A * 12/1982 Yaegashi et al. ............ 439/497
6,631,554 B1 * 10/2003 Sato et al. ...................... 29/828

FOREIGN PATENT DOCUMENTS

JP 2002-305049 * 10/2002
JP 2002305049 10/2002
JP 2003123882 4/2003
JP 2003141952 5/2003

* cited by examiner

*Primary Examiner*—William H Mayo, III
(74) *Attorney, Agent, or Firm*—Martin Fleit; Paul D. Bianco; Fleit Gibbons Gutman Bongini & Bianco PL

(57) ABSTRACT

The multi-coaxial cable assembly includes a multi-coaxial cable in which a plurality of coaxial cables having insulators, external conductors, and jackets on an outer periphery of center conductors are arranged in parallel; inclined cross sections formed on the end part of the multi-coaxial cable in such a manner as exposing the center conductors and the external conductors of the coaxial cables; and a wiring board or a connector having a wiring pattern to which the center conductors and the external conductors of the coaxial cables exposed on the inclined cross sections are directly connected.

12 Claims, 10 Drawing Sheets

MULTI-COAXIAL CABLE ASSEMBLY AND MANUFACTURING METHOD OF THE SAME

BACKGROUND

1. Technical Field

The present invention relates to a multi-coaxial cable assembly and a manufacturing method of the same, and further specifically relates to the multi-coaxial cable assembly capable of improving a connection structure/method between a plurality of coaxial cables of a multi-coaxial cable, and a wiring pattern of a wiring board or a connector.

2. Description of Related Art

As illustrated in FIG. 12, a conventional connection method of an superfine coaxial cable (superfine coaxial line) used in a medical device and an electronic device includes the steps of: stripping stepwise sequentially jackets 105, external conductors (shield lines) 104, and insulators 103 of a terminal of a plurality of superfine coaxial cables 101, and exposing the external conductors 104, the insulators 103, and center conductors 102 respectively, then parallely arranging these exposed plurality of coaxial cables 101, then connecting the exposed external conductors 104 to ground lines 107 of a printed board or a connector by using solder 108, etc, and connecting the exposed center conductors 102 to signal lines (electrode pad for signal lines) 106 of the printed board or the connector by solder 108, etc.

The above-described connection structure/form is formed, for example, by a manufacturing method as described below.

First, the coaxial cables 101, with length up to terminals made uniform, are parallely arranged on a jig in which parallel grooves are formed, and by using resin and adhesive agent, etc, the coaxial cables 101 are fixed to each other so as to be maintained in a parallely arranged state, and set in a flat cable state.

The jackets 105 of the coaxial cables 101 are collectively notched by, for example, laser beam and a cutter in a direction orthogonal to an axial direction, then the jackets 105 are collectively pulled-off from the terminal side of the coaxial cables 101, and the external conductors 104 are thereby exposed.

Next, the exposed external conductors 104 are cut by the laser beam and the cutter, while leaving a required length for connection, and the insulators 103 are thereby exposed.

The exposed insulators 103 are collectively notched and pulled off again by using the laser beam and the cutter, while leaving a length that allows no short circuit to occur between the external conductors 104 and the center conductors 102, when the coaxial cables 101 are connected to the printed board or the connector, and thereby the center conductors 102 are exposed.

By using the above-described method, the plurality of coaxial cables 101, with the external conductors 104, the insulators 103, and the center conductors 102 exposed and arranged in the terminals, are positioned so as to be preferably connected to the ground lines 107 and the signal lines 106 of the printed board or the connector, and by using the solder 108, etc, the external conductors 104 are connected to the ground lines 107, and the center conductors 102 are connected to the signal lines 106, electrically, collectively, or individually.

However, in the aforementioned conventional connection method of the superfine coaxial cables, strip work must be performed twice, to expose the external conductors 104 and the center conductors 102.

In addition, exposed parts of the external conductors 104 and exposed parts of the center conductors 102 are distributed in a wiring direction (axial direction) of the coaxial cables 101, and the plurality of coaxial cables 101 are parallely arranged and also distributed in a parallel direction orthogonal to the wiring direction. Therefore, when the coaxial cables 101 are connected to the printed board or the connector, positioning accuracy is required in two directions such as the wiring direction and the parallel direction, and further a certain degree of area is required in a wiring pattern such as the ground lines 107 and the signal lines 106 provided in the printed board and the connector.

Moreover, in recent years, further superfine coaxial cables have been progressed, and it is difficult to maintain a parallel state capable of performing a sufficient positioning of the external conductors, the insulators, the center conductors of the plurality of coaxial cables in a state of exposing terminal connection parts, with respect to the wiring patterns of the printed board or the connector.

Therefore, in order to maintain the parallel state of the plurality of coaxial cables, for example, patent document 1 (Japanese Patent Laid Open Publication No. 2003-141951) proposes a method of parallely arranging a plurality of coaxial cables with external conductors exposed; fixing two ground bars extending in a parallel direction of the coaxial cables to the external conductors with two ground bars extending in the parallel direction exposed, and maintaining a parallel state of the center conductors and the external conductors by the ground bars, until the center conductor between two ground bars is exposed.

Also, for example, patent document 2 (Japanese Patent Laid Open Publication No. 2003-123882) proposes a method of collectively cutting the end parts of the coaxial cables arranged in parallel, without sequentially peeling off and exposing the external conductors and the center conductors of the superfine coaxial cables, and collectively connecting the center conductors and the external conductors of a sectional face in a non-peeling off state, directly to the wiring pattern of the printed board.

However, in the method of the aforementioned patent document 1, the terminals of the coaxial cables can be maintained in parallel state by using the two ground bars. However, wider area of the wiring pattern for connecting to the printed board or the connector is required, and the accuracy required for positioning is not different from the related art shown in FIG. 12.

Further, in the method of patent document 2, the strip work performed twice can be shortened to a cutting work of once, and this cutting work provides a cut section in which the external conductors are concentrically arranged around the center conductors of the superfine coaxial cables, and the wiring pattern at the printed board side, to which the coaxial cables are connected, is the wiring pattern fitted to the concentric arrangement in the aforementioned cut section. Therefore, there is a problem that accuracy more than that of the related art shown in FIG. 12 is required for positioning at the time of connection.

SUMMARY OF THE INVENTION

One of the aspects of a multi-coaxial cable assembly of the present invention includes:

a multi-coaxial cable in which a plurality of coaxial cables having insulators, external conductors, and jackets on the outer periphery of center conductors are arranged;

end parts formed into inclined cross sections having the multi-coaxial cable in such a manner as exposing the center conductors and the external conductors of the coaxial cables;

a wiring board or a connector having a wiring pattern in which the center conductors and the external conductors of the coaxial cables are directly connected thereto, so as to be exposed on the inclined cross sections.

One of the aspects of a manufacturing method of the multi-coaxial cable assembly of the present invention includes the steps of:

removing a part of the end part of the multi-coaxial cable in which a plurality of coaxial cables are arranged in parallel having insulators, external conductors, and jackets on an outer periphery of center conductors, and forming inclined cross sections in such a manner as exposing the center conductors and the external conductors of the coaxial cables; and directly connecting the center conductors and the external conductors of the coaxial cables exposed on the inclined cross sections, to a wiring pattern formed on a wiring board or a connector.

The present invention provides the multi-coaxial cable assembly and the manufacturing method of the same, capable of simplifying a connection work between a plurality of coaxial cables and the wiring pattern of the wiring board or the connector, and capable of reducing positioning accuracy required for connection.

DETAILED DESCRIPTION OF THE INVENTION

An embodiment of a multi-coaxial cable assembly and a manufacturing method of the same according to the present invention will be explained hereunder, by using the drawings.

First Embodiment

A first embodiment of the multi-coaxial cable assembly and the manufacturing method of the same according to the present invention will be explained by using FIG. 1 to FIG. 4.

Figure 1:
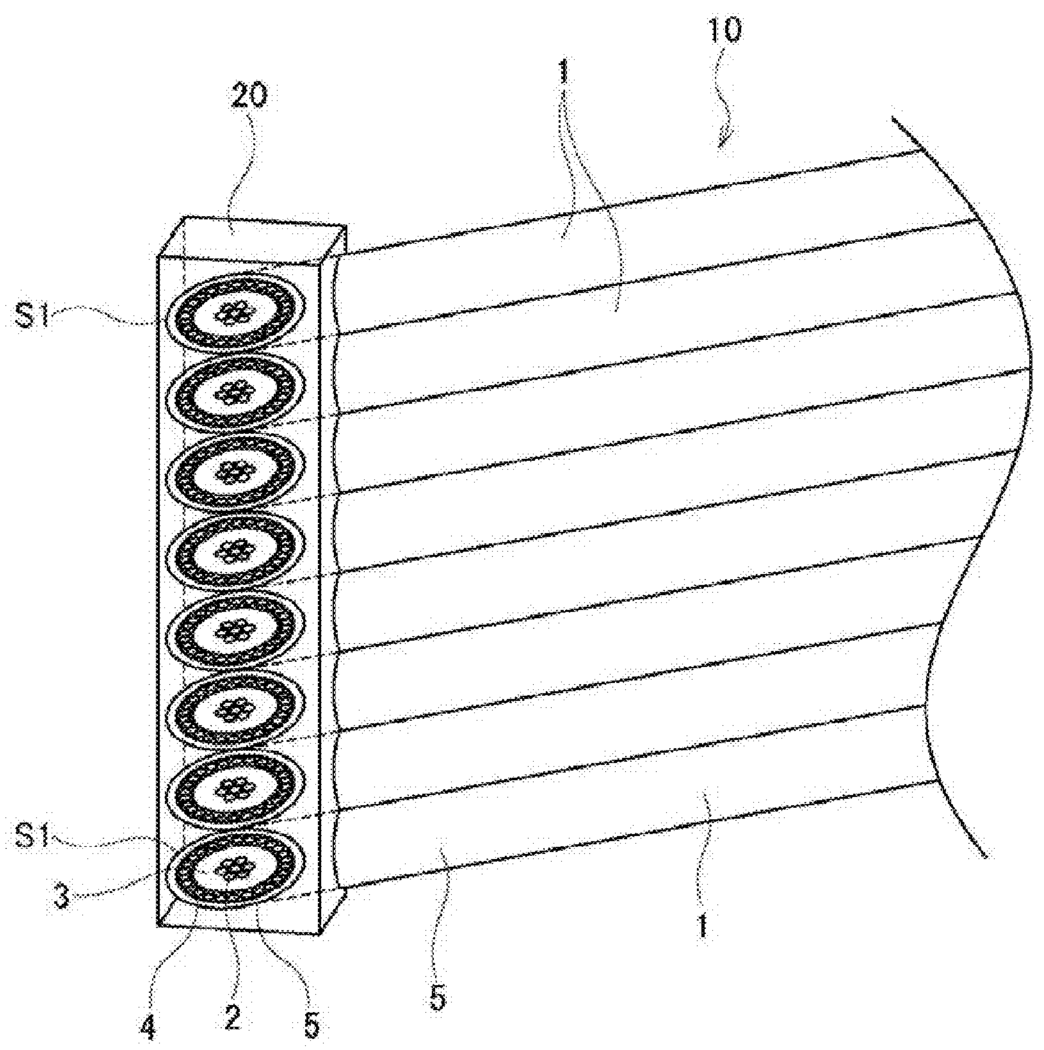
FIG. 1 is a perspective view illustrating a connection end part of a multi-coaxial cable according to a first embodiment of the present invention.

As illustrated in FIG. 1, in superfine coaxial cables 1 used in this embodiment, outer peripheries of center conductors (inner conductors) 2 are coated with insulators (inner insulators) 3, external conductors (shields, outer conductors) 4 and jackets (sheaths, outer insulators) 5, respectively, with these insulators 3, external conductors 4, and jackets 5 concentrically arranged in the outer peripheries of the center conductors 2 having circular sections.

Each center conductor 2 is a strand wire formed by a plurality of wires composed of a copper wire or a copper alloy wire plated with Sn and Ag, for example. Specifically, the center conductor 2 is composed of seven strand wires, with each wire having a diameter of 0.013 mm (corresponding to 48 AWG (American Wire Gauge), and outer diameter set at 0.039±0.002 mm. Note that the center conductor is not required to be the strand wire and may be a single wire.

Fluorine resin such as PFA (tetrafluoroethylene—perfluoroalkylvinyl ether copolymer) is used in each insulator 3. The diameter up to the insulator 3 is set at 0.093 mm. Each external conductor 4 is a spiral covered shield in which the wire composed of the copper wire or the copper alloy wire plated with Sn and Ag is wound around the shield, or is a braided shield in which the wire is crossed with each other to form a mesh-like form by combining each crossed wire. In this embodiment, the wire having the diameter of 0.016 mm is used in the external conductor 4, with the outer diameter set at about 0.12 mm, and the diameter up to each jacket 5 is set at about 0.160 mm. Insulating rubber such as polyethylene is used in the jacket 5.

Next, explanation will be given for a formation method of the terminal connection part of the multi-coaxial cable 10 in which the aforementioned plurality of coaxial cables 1 are arranged in parallel.

Figure 2A:
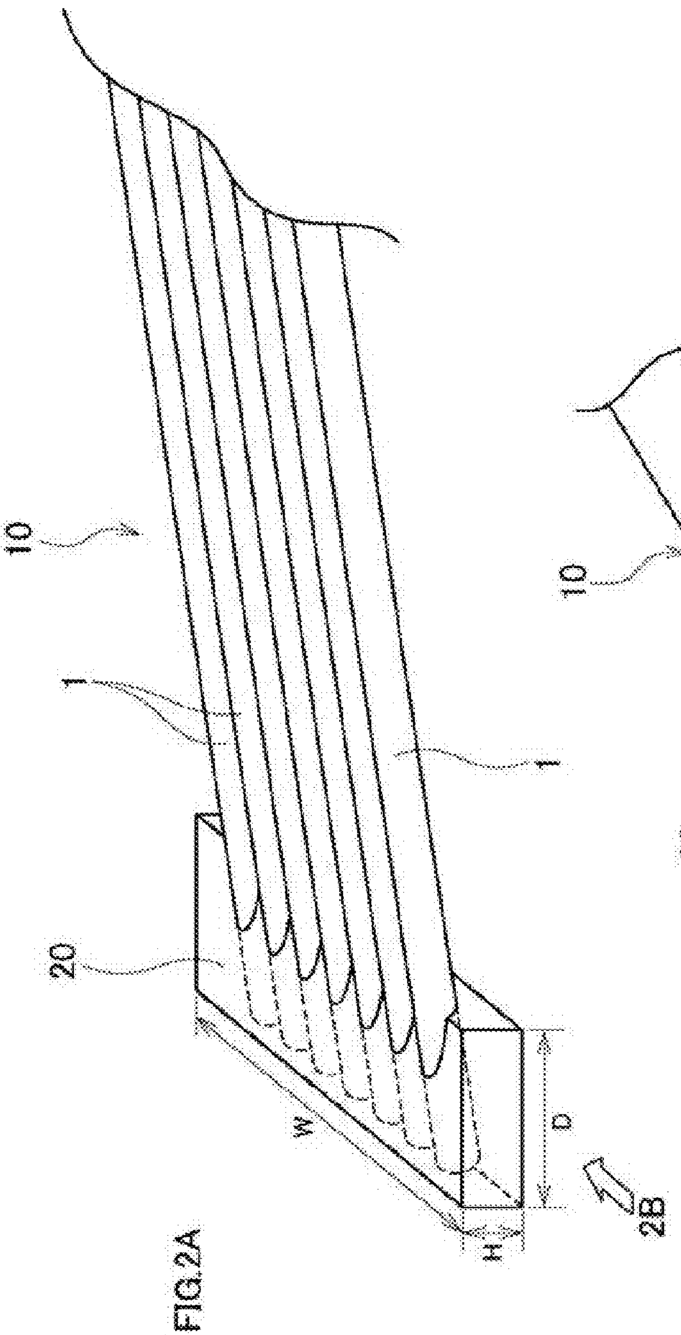
FIG. 2A is a perspective view illustrating a manufacturing step of the end part of the multi-coaxial cable of FIG. 1.

First, a plurality of (for example eight in the example of the figure) superfine coaxial cables 1, with terminal ends made uniform, are arranged in parallel at an interval so that the jacket 5 of each coaxial cable 1 is brought into contact with each other, then as illustrated in FIG. 2A, terminal parts are fixed, to constitute the multi-coaxial cable 10 in which the coaxial cables 1 are arranged in a flat cable state. The end part of the multi-coaxial cable 10 of this embodiment are embedded in an insulating resin so as to be fixed thereto and formed into a resin fixed part 20.

Figure 2B:
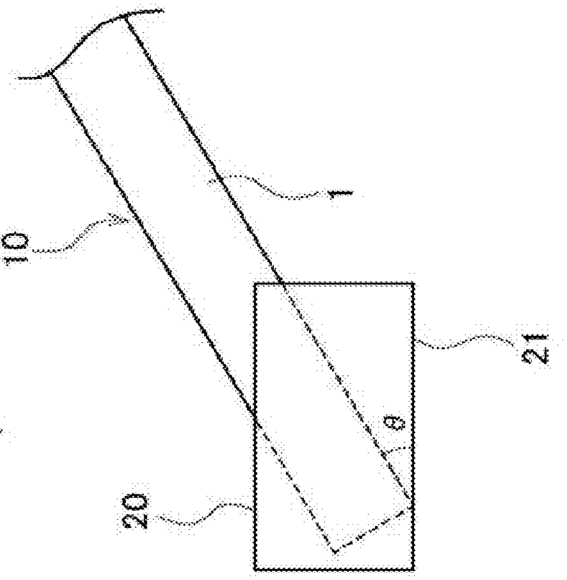
FIG. 2B is a side view of the end part of the multi-coaxial cable of FIG. 2A viewed from 2B direction.

The resin fixed part 20 is molded by inserting the coaxial cables 1 in a state of being arranged in a flat cable state within a molding die (such as a frame body, with an opening 74 of a frame body 71 of FIG. 9A as will be described closed by a bottom wall) having a resin containing part of a rectangular parallelepiped shape, with an upper part opened, whereby the resin fixed part 20 is formed, then by filling the resin container of the molding die with resin, and solidifying the resin. Note that the molding die made of resin may constitute the outer peripheral part of the resin fixed part 20. In addition, the molding die has inclined parallel grooves (such as parallel grooves 75 or parallel grooves 76 formed in the frame body 71 of FIG. 9A as will be described later), whereby the coaxial cables 1 arranged in a flat cable state, are supported/guided at a prescribed inclined angle θ (shown in FIG. 2B) with respect to the bottom face of the molding die into which the coaxial cables are inserted. The resin fixed part 20 has a rectangular parallelepiped shape, with a width W in the parallel direction of the coaxial cables 1 set at 1.5 mm, a depth D in a length direction of the coaxial cables 1 set at 0.65 mm, and a height H set at 0.3 mm, for example. As illustrated in FIG. 2B, the axial direction (longitudinal direction) of the coaxial cables 1 of the multi-coaxial cable 10 is solidified in a state of being inclined at inclined angle θ (such as 30°) from a direction parallel to the bottom face 21 of the rectangular parallelepiped resin fixed part 20.

A thermosetting resin such as epoxy resin is used in the resin of the resin fixed part 20. The resin having both of the flowability before being solidified and mechanical machinability after being solidified is preferable for the resin of the resin fixed part 20, because after the coaxial cables 1 are arranged and solidified in the flat cable state, the resin fixed part 20 is subjected to cutting/grinding/polishing processing as will be described later.

Figure 3A:
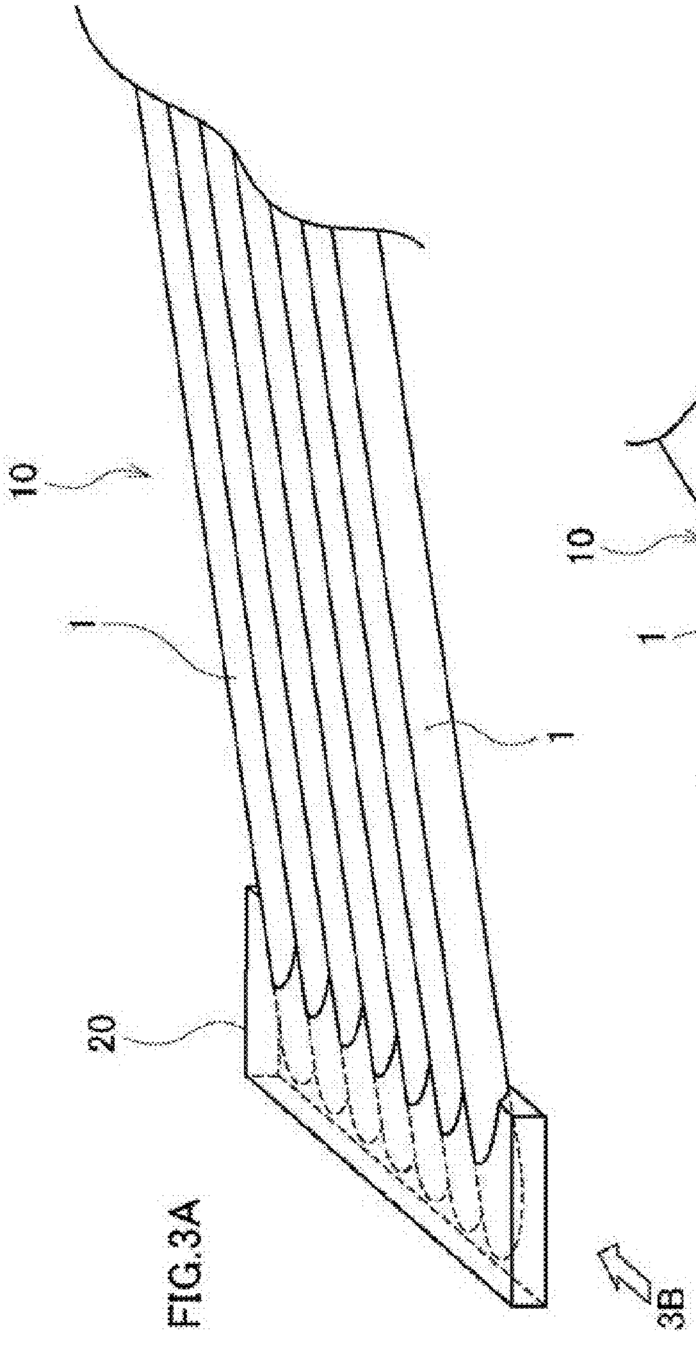
FIG. 3A is a perspective view illustrating the manufacturing step of the end part of the multi-coaxial cable of FIG. 1.
Figure 3B:
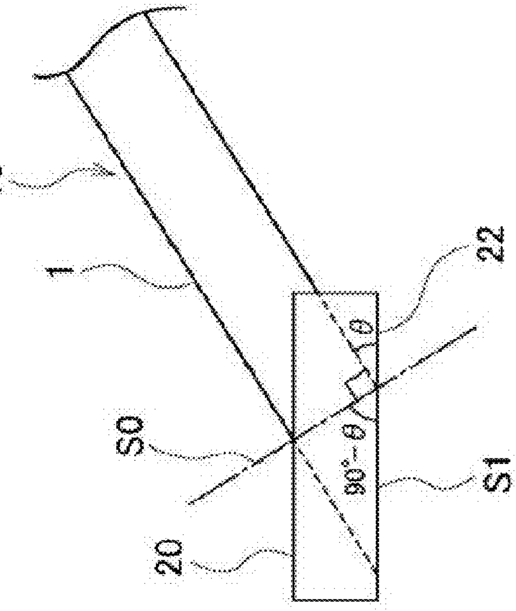
FIG. 3B is a side view of the end part of the multi-coaxial cable of FIG. 3A viewed from 3B direction.

Subsequently, as illustrated in FIG. 3A and FIG. 3B, a bottom face 21 of the resin fixed part 20 is ground and polished, until the height H of the rectangular parallelepiped resin fixed part 20 is set at about 0.15 mm. By this grinding/polishing, the resin of the resin fixed part 20 and the coaxial cables 1 embedded in the resin are removed together, to expose inclined cross sections S1 of the coaxial cables 1, on a bottom face 22 after the resin fixed part 20 is removed. Cutting operation is performed, for example, by a precise cutter of a rotary cutting teeth type such as a dicing saw, and further polishing operation is performed, for example, by a polishing machine of a turn table type, to reduce irregularities on the inclined cross sections S1 of the coaxial cables 1, to thereby form the inclined cross sections S1. Note that as a formation of the inclined cross sections by partially removing the coaxial cables, for example, the cross sections may be formed only by cutting by a precise cutter, or only by grinding by a grinding machine, or only by polishing by a polishing machine.

As illustrated in FIG. 3B, the inclined cross sections S1 of the coaxial cables 1 that appear on the bottom face 22 of the resin fixed part 20 are formed into the cross sections inclined by 90°−θ (60° in case of θ=30°) with respect to vertical cross sections SO obtained by vertically cutting the coaxial cables 1 in the axial direction. Namely, the inclined cross sections S1 of the coaxial cables 1 are formed into elliptic cross sections as illustrated in FIG. 1, which are formed by vertically extending circular cross sections long in the axial direction, in the case of cutting the coaxial cables 1 vertically to the axial direction. In the case of the cross sections inclined at 60°, the cross sections of the center conductors 2 (having outer diameters of about 0.039 mm) in the inclined cross sections S1 are expanded in the axial direction, to be formed into the elliptic cross sections, with a long axis set at about 0.080 mm and a short axis set at 0.039 mm. Similarly, the external conductors 4 are also expanded in the axial direction to be formed into the elliptic cross sections, with the long axis set at 0.25 mm and the short axis set at 0.12 mm.

Meanwhile, as illustrated in FIG. 4, the center conductors 2 and the external conductors 4 exposed on the inclined cross sections S1 of the coaxial cables 1 are directly connected to a wiring pattern 41, and this wiring pattern 41 is formed on a printed board (wiring board) 40 to which the multi-coaxial cable 10, wherein the aforementioned coaxial cables 1 are parallely arranged, is connected. The wiring pattern 41 has electrode pads 42 for connecting signal lines to which the center conductors 2 are directly connected, and electrode pads 43 for ground lines to which the external conductors 4 are directly connected, and the electrode pads 42 and the electrode pads 43 are alternately arranged on a line in the parallel direction of the coaxial cables 1. The electrode pads 42 for connecting signal lines are formed in rectangle shapes, with a size in the length direction (axial direction of the coaxial cables 1) set at 0.080 mm, the size in the width direction (the parallel direction of the coaxial cables 1) set at 0.040 mm, and the electrodes 43 for ground lines are formed in the rectangle shape, with the size in the length direction set at 0.080 mm, and the size in the width direction set at 0.060 mm. The electrode pads 42 for connecting signal lines and the electrode pads 43 for ground lines are alternately provided at an interval of 0.030 mm. Note that the electrode pads 42 for connecting signal lines and the electrodes 43 for ground lines are not limited to have the rectangle shapes, and may have long elliptic shapes in the length direction (the axial direction of the coaxial cables 1).

The electrode pads 42 and 43 are formed into a gold bump (gold plating wiring), and are protruded by about 0.020 mm from the surface of the peripheral printed board 40. In addition, the signal lines (not shown) are connected to the electrode pads 42, and the ground lines (not shown) are connected to the electrode pads 43, respectively, and these signal lines and the ground lines are penetrated to the rear side of the printed board 40, or connected to an electric circuit (not shown) through the inside of the printed board 40. A glass epoxy board or a flexible printed board made of polymer, etc, can be given as examples of the printed board 40.

Figure 4A:
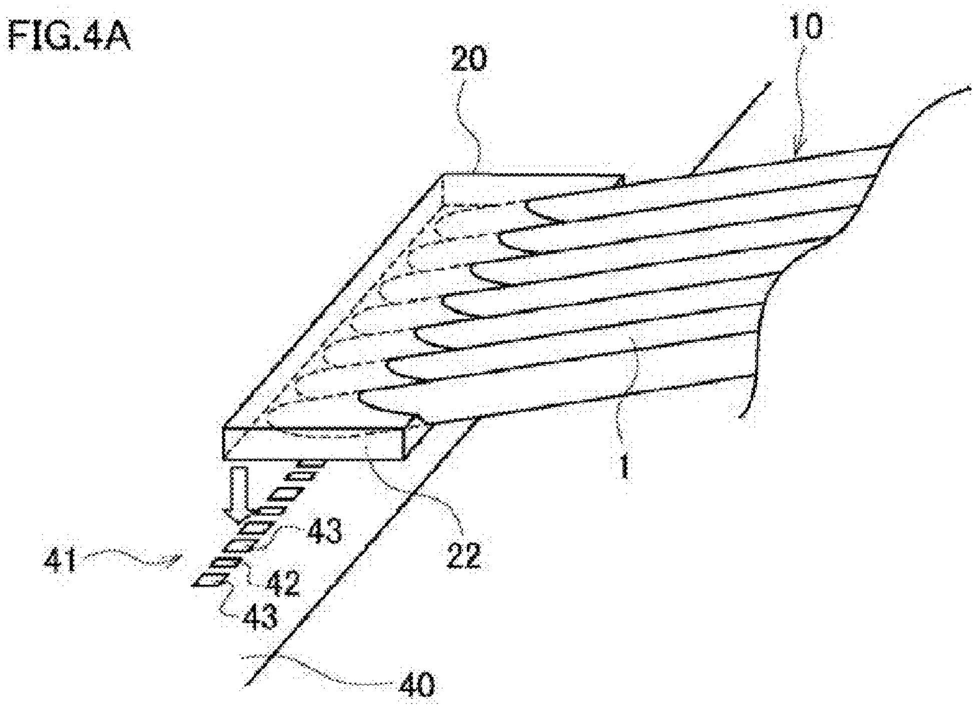
FIG. 4A is a perspective view explaining a connection step between the multi-coaxial cable and a printed board.
Figure 4B:
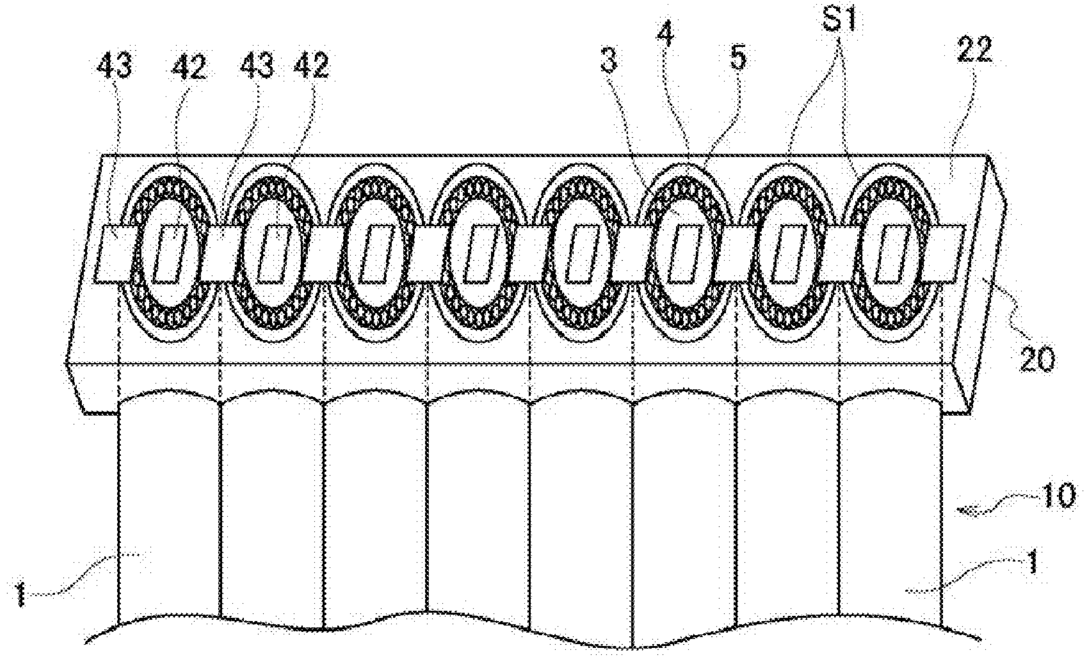
FIG. 4B is a view illustrating a connection state between the multi-coaxial cable and a wiring pattern of the printed board.

When the wiring pattern 41 on the printed board 40 and the multi-coaxial cable 10 are connected to each other, as illustrated in FIG. 4A and FIG. 4B, they are joined with each other in such a manner that the center conductors 2 and the external conductors 4 exposed on the inclined cross section S1 of each coaxial cable 1 of the resin fixed part 20 are positioned so as to be brought into contact with the electrode pads 42 and 43 of the wiring pattern 41 to be matched with these electrode pads, and ultrasonic vibration is given while applying pressure thereto. Note that a connection method is not limited to an ultrasonic bonding method, and it may be possible to use a welding method and a system of applying pressure, with an anisotropic conductive material (Anisotropic Conductive Film) interposed between the center conductors 2 and the electrode pads 42, and the external conductors 4 and the electrode pads 43.

The aforementioned positioning is performed, so as to form a state in which a fitting frame (not shown) fitted to the shape of the resin fixed part 20 is provided on the side of the printed board 40, and the resin fixed part 20 is mounted on this fitting frame, so that the center conductors 2 and the external conductors 4 are matched with the electrode pads 42 and the electrode pads 43 in a butted state. Also, in the connection between the center conductors 2 and the external conductors 4, and the electrode pads 42 and 43, as electrode pads 42 and 43, reflow may be executed by using Sn bump instead of the gold bump, and an anisotropic conductive resin may also be used.

In the vertical cross sections S0 in the case of cutting the coaxial cables 1 along the surfaces vertical to the longitudinal direction of the cables, the center conductors 2, the insulators 3, and the external conductors 4 are formed into concentric circular shapes. Therefore, when positioning with respect to a connection object is performed on the vertical cross sections, precise positioning is necessary in two axes (two directions) of upper/lower and right/left directions in the vertical cross sections. Meanwhile, in the case of the inclined cross sections cut along the inclined surfaces, the cross sections are expanded on the axes along the inclined directions, thus increasing an absolute value of an allowable deviation amount of the positioning of the inclined cross sections in the long axis direction. Accordingly, connection is possible only by positioning with high precision in one axis direction or first dimensional direction, being only parallel direction of the coaxial cables 1.

The center conductors 2 are connected to the electrode pads 42, with widths set at 0.040 mm. However, the electrode pads 43 for ground lines can be shared with two external conductors 4, 4 of parallely adjacent coaxial cables 1, 1, and therefore the external conductors 4 are connected to the electrode pads 32 for ground lines with width set at 0.060 mm. At this time, when the allowable deviation amount at the time of connection is set at 10% of a diameter of the conductor, positioning must be performed with deviation amount within about 0.004 mm in the parallel direction of the coaxial cables 1. However, the inclined cross sections S1 have the shapes formed by expanding the vertical cross sections twice in the longitudinal direction. Therefore, when the deviation of about 0.060 mm or more occurs, the external conductors 4 are brought into contact with the electrode pads 42 for signal lines in the longitudinal direction. Accordingly, the positioning with high precision can be performed by only one axis in the parallel direction of the coaxial cables 1.

Figure 5:
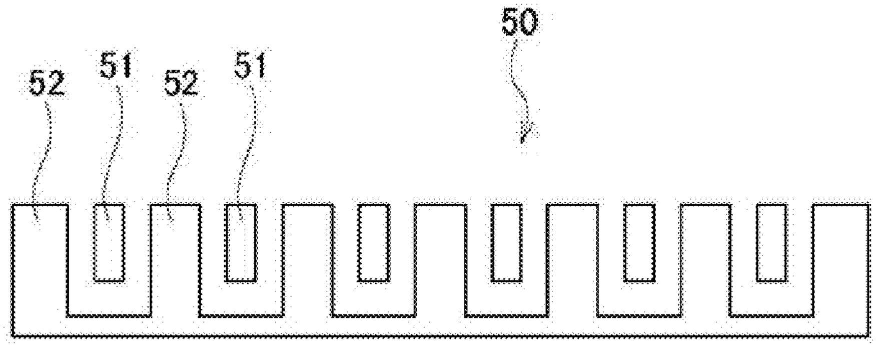
FIG. 5 is a plan view illustrating other embodiment of the wiring pattern.

Note that the wiring pattern of the printed board is not limited to the wiring pattern 41 shown in FIG. 4A, and may be the wiring pattern as illustrated in FIG. 5, in which electrode pads (signal lines) 51 to which the center conductors 2 are connected, and electrode pads (ground lines) 52 to which the external conductors 4 are connected, are alternately provided, and the electrode pads 52 for ground lines are all connected.

In addition, according to the aforementioned first embodiment, explanation is given for the multi-coaxial cable assembly using the printed board, as an object to which multi-coaxial cable is connected. However, the present invention can be applied to the multi-coaxial cable assembly in which the multi-coaxial cable is connected to the connector. In this case, for example, the multi-coaxial cable may be connected to the connector having the wiring pattern substantially equal to the wiring pattern 41 illustrated in FIG. 4, or the wiring pattern 50 illustrated in FIG. 5.

Figure 6:
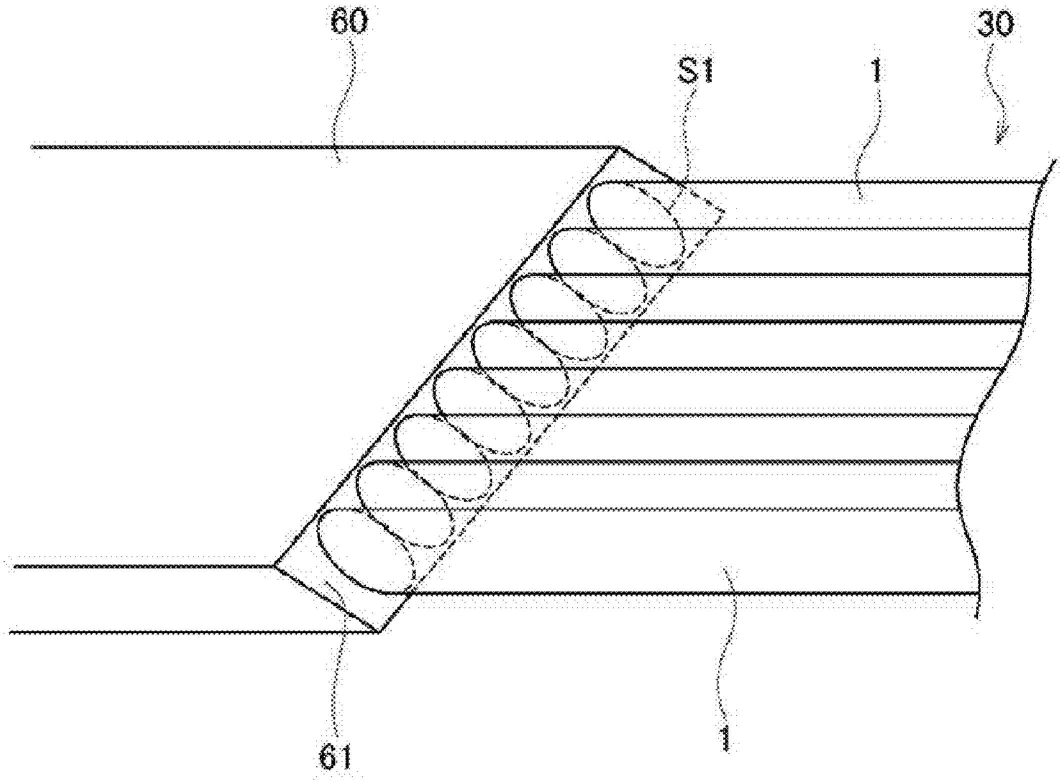
FIG. 6 is a schematic perspective view illustrating other embodiment of a multi-coaxial cable assembly of the present invention.

Further, according to the aforementioned embodiment, the wiring pattern 41 is formed on the printed board (wiring board) 40. However, as illustrated in FIG. 6, the wiring pattern (not shown) as illustrated in FIG. 4A and FIG. 5 may be formed on an end face 61 of a printed board (wiring board) 60. In this case, for example, as illustrated in FIG. 6, the end face 61 of the printed board 60 is formed on the inclined surface corresponding to inclined angles of the inclined cross sections S1 of the coaxial cables 1, and each inclined cross section S1 of the tip end surface of multi-coaxial cable 30, in which the coaxial cables 1 are arranged in parallel, may be butted with the wiring pattern on the substrate end face 61 so as to be connected thereto. Connection may be made in this case, in such a manner as inserting a socket-like portion (not shown) of the tip end of the multi-coaxial cable 30 into the substrate 60. It may be also possible that the end face part having the wiring pattern of the printed board is folded back, so that the wiring pattern part on the printed board is formed into an inclined surface, and in the same way as FIG. 6, each inclined cross section S1 of the tip end surface of the multi-coaxial cable 30 is butted with the wiring pattern on the inclined surface so as to be connected thereto.

Second Embodiment

Next, a second embodiment of the present invention will be explained by using FIG. 7A to FIG. 10.

According to the aforementioned first embodiment, the cross sections of the coaxial cables 1 are formed into the inclined cross sections S1 inclined at a certain constant inclined angle, compared with a case in which the cross sections are vertically cut in the axial direction of the coaxial cables 1. However, in this second embodiment, the inclined angles within the inclined cross sections S2 of the coaxial cables 1 are not constant and varied.

Figure 7A:
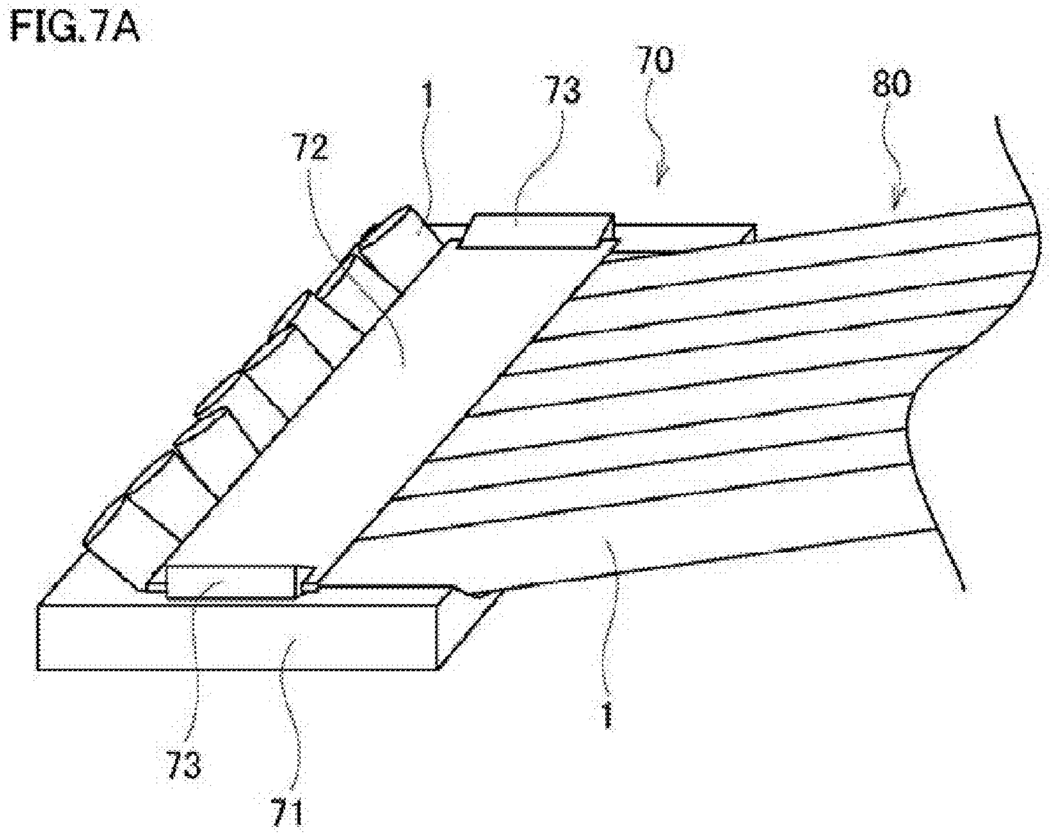
FIG. 7A is a perspective view illustrating a connection end part of the multi-coaxial cable according to a second embodiment of the present invention.
Figure 7B:
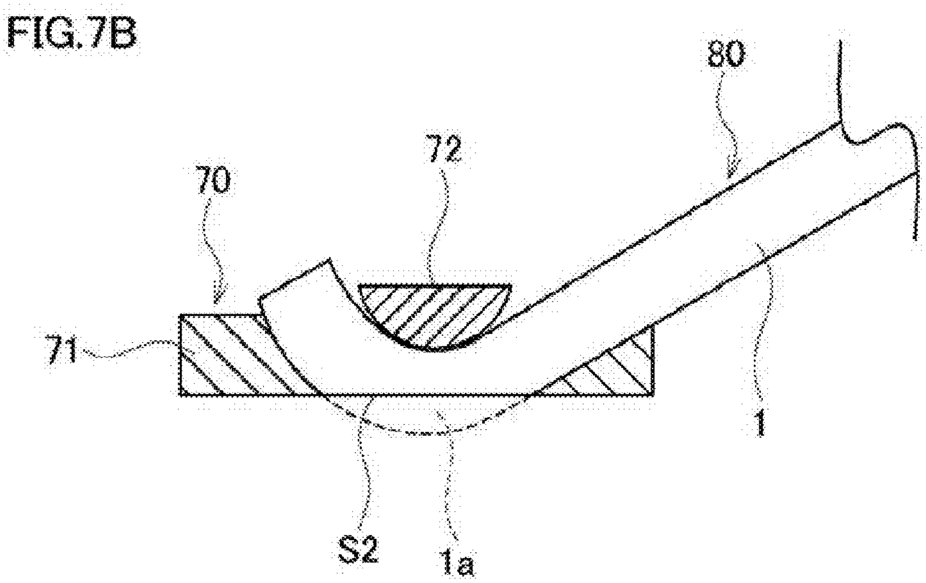
FIG. 7B is a schematic sectional view when the end part of the multi-coaxial cable of FIG. 7A is cut in a longitudinal direction of the cable.

According to the second embodiment, as illustrated in FIG. 7A, a jig 70 for fixing a plurality of coaxial cables 1 in a state of being arranged in parallel and curved, and as illustrated in FIG. 7B, the parts including curved parts of the coaxial cables 1 are removed to form the inclined cross sections S2.

The aforementioned jig 70 has, as illustrated in FIGS. 7A, 7B, or FIGS. 9A to 9C, a frame body 71 having a rectangular opening 74, and a pushing member 72 for curving the coaxial cables 1 and pushing them into the opening 74.

Figure 9A:
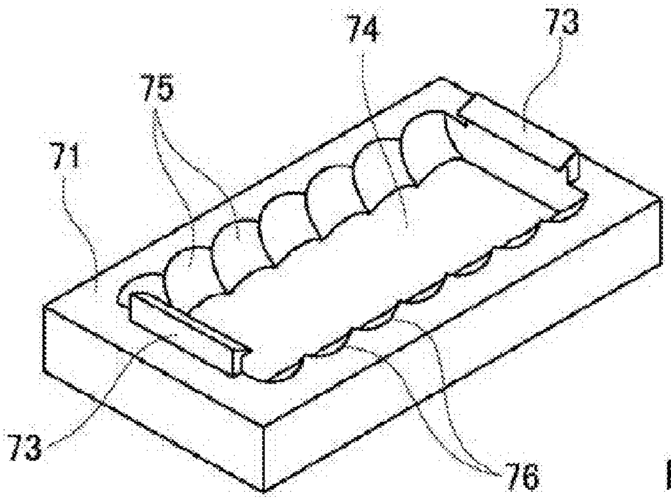
FIG. 9A is a perspective view illustrating a frame body of a jig used in FIG. 7A.
Figure 9B:
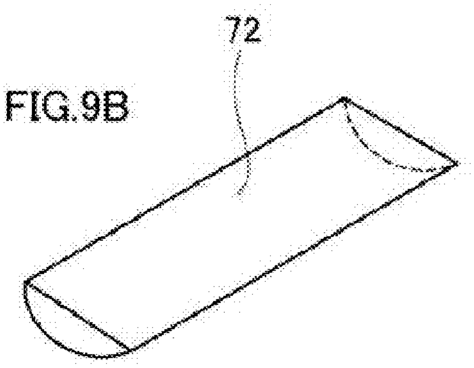
FIG. 9B is a perspective view illustrating a pushing member of the jig used in FIG. 7A.
Figure 9C:
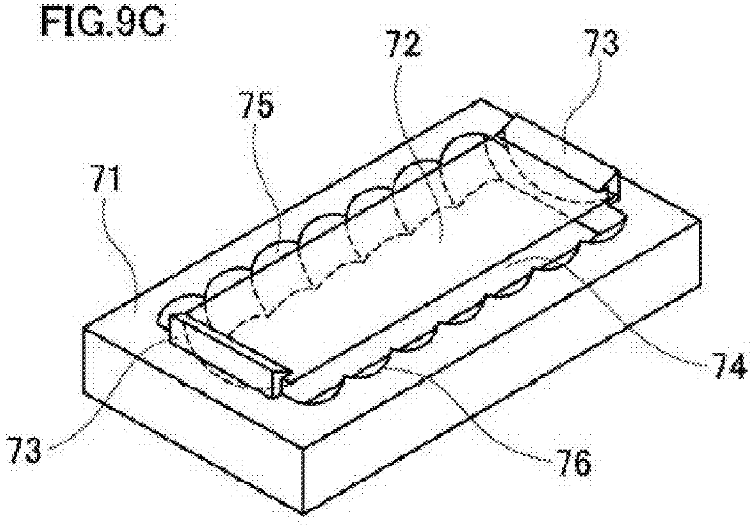
FIG. 9C is a perspective view illustrating a state of combining the frame body and the pushing member of the jig used in FIG. 7A.

As illustrated in FIG. 9A, the frame body 71 has the rectangular opening 74, and in the upper part of the frame body 71 of the shorter side of the opening 74, locking parts 73, 73 are formed, for locking the pushing member 72 at the time of pushing the coaxial cables 1. FIG. 9C shows a state of combining the frame body 71 and the pushing member 72. In addition, inclined parallel grooves (concave parts) 75, 76 are formed, with the coaxial cables 1 parallely arranged and curved on an inner wall surface of the frame body 71 of a longer side of the opening 74. As illustrated in FIG. 9B, the pushing member 72 is a columnar member with a cross section formed in an arched shape.

Figure 10:
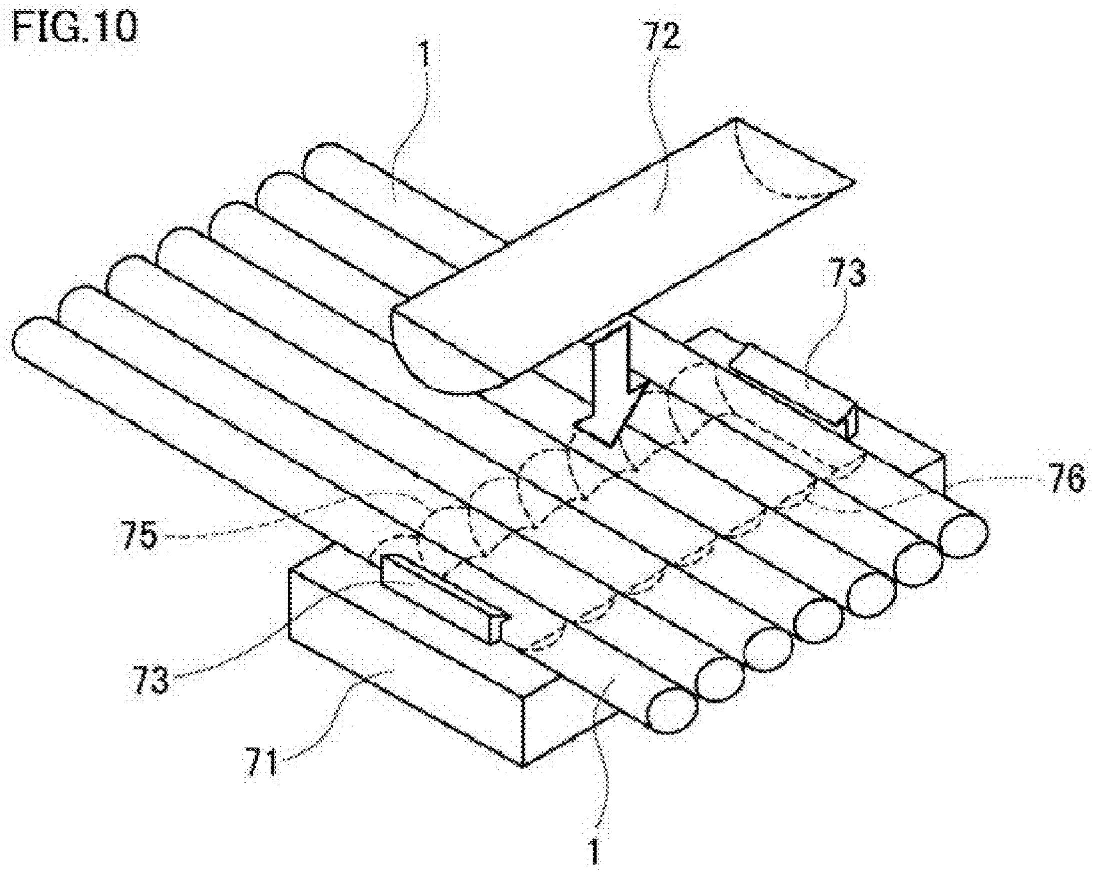
FIG. 10 is a perspective view explaining the manufacturing method of the end part of the multi-coaxial cable of FIG. 7A.

When a plurality of coaxial cables 1 are arranged in parallel by using the jig 70 and fixed in a state of being curved, as illustrated in FIG. 10, the plurality of coaxial cables 1 are arranged in parallel in the shorter side direction of the opening 74, and the coaxial cables 1 are laid across the opening 74 so as to be arranged on the frame body 71, and thereafter the plurality of coaxial cables 1 are pushed down toward the opening 74, with a convex curved surface side of the pushing member 72 directed downward. By push-down of the pushing member 72, the coaxial cables 1 are bent along the curved surfaces of the parallel grooves 75, 76 and set in a state of being pushed out from the opening 74. By push-down of the pushing member 72, the locking part 73 is expanded, and returns to an original state when the pushing member 72 is pushed down by a prescribed amount, so that the upper surface of the pushing member 72 is locked and fixed thereto. Thus, as illustrated in FIG. 7A and FIG. 7B, the coaxial cables 1 are fixed in a state of being bent and curved with a prescribed curvature, then a part 1*a* pushed out in a bent state is removed from the opening 74 of the coaxial cables 1, and the inclined cross sections S2 are formed on the end parts of the coaxial cables 1.

The removal of the part la pushed out from the opening 74 of the coaxial cables 1 is performed by using a turn table type polishing machine. The part 1*a*, being about half diameter portion of each coaxial cable 1 pushed out from the opening 74 of the frame body 71 and protruded from the lower surface of the frame body 71 is subjected to grinding by the polishing machine, and the coaxial cables 1 are polished until the end parts of the coaxial cables 1 are matched with the lower surface of the frame body 71.

An engineering plastic of thermoplastic resin such as polyamide and polycarbonate is preferably used as the material of the jig 70, because it can be manufactured by using injection molding, etc, and parts 1*a* of the protruded coaxial cables 1 need to be removed by cutting/grinding/polishing.

Figure 8:
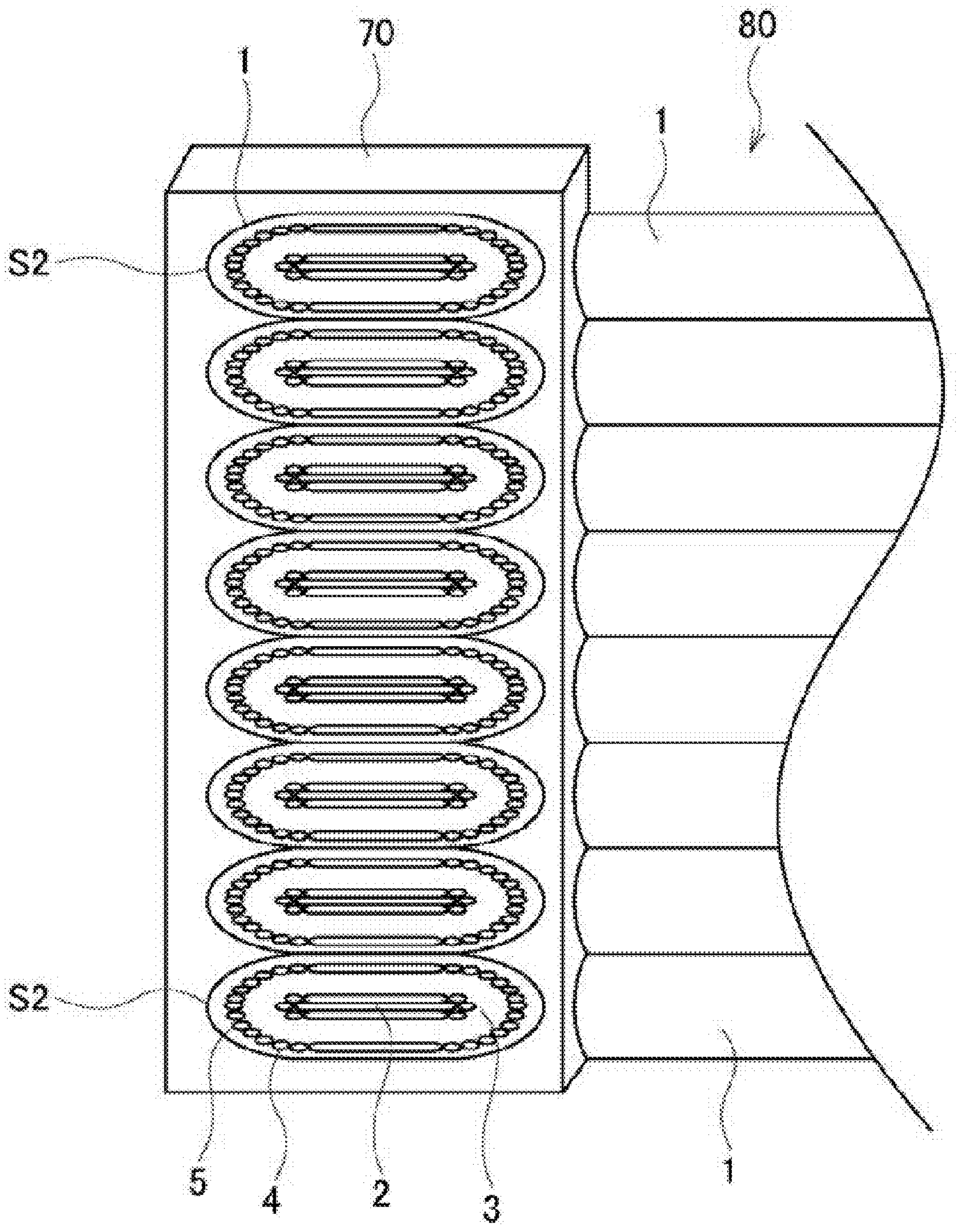
FIG. 8 is a perspective view of the end part of the multi-coaxial cable of FIG. 7A viewed from a lower surface side.

By removing the aforementioned coaxial cables 1 by polishing, as illustrated in FIG. 8, elongated elliptic inclined cross sections S2, with the center conductors 2, insulators 3, external conductors 4, and jackets 5 inside of the coaxial cables 1 exposed, are formed on the lower surface of the jig 70. Regarding a ratio in a length direction of the cables of the center conductors and the external conductors 4, dimensions of the inclined cross sections S2 formed by removing the bent portions of the coaxial cables 1 can be further expanded, compared with the inclined cross sections S1 of the first embodiment. Therefore, the cross sections can be exposed, with the dimensions of the inclined cross sections S2 expanded to be twice the dimensions of vertically exposed cross sections in the longitudinal direction of the cables.

Accordingly, in the same way as the first embodiment, in the case of the second embodiment also, although the positioning accuracy in the parallel direction of the coaxial cables 1 is required, if only a certain degree of the positioning accuracy is provided for the longitudinal direction of the coaxial cables 1, the connection is enabled. Further, in the case of the second embodiment, longitudinal cross sections of the center conductors 1 are sufficiently longer than the case of the first embodiment, and as a result, it is possible to increase an area in contact with directly connected electrodes, etc. This is advantageous in the point that a trouble such as a poor connection hardly occurs.

The positioning between the center conducts 2 and the external conductors 4 of the inclined cross sections S2 of the coaxial cables 1, and the electrode pads, etc, being the wiring pattern of the wiring board, is performed in such a manner that, as described in the first embodiment, for example, the fitting frame (not shown) fitted to the shape of the jig 70 is provided on the side of the printed board, and by fitting the jig 70 to this fitting frame, the center conductors 2 and the external conductors 4 are respectively matched with the electrode pads, etc., respectively, in a butting state.

A curvature radius of each coaxial cable 1 curved and fixed by the jig 70 is preferably set at about twice the diameter of the coaxial cable 1.

Figure 11:
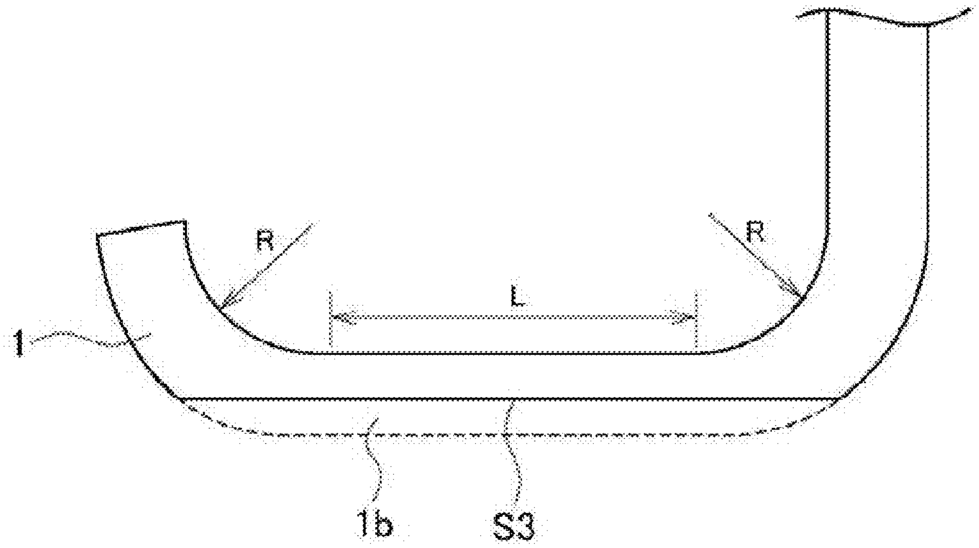
FIG. 11 is a side view of a coaxial cable showing inclined cross sections according to other embodiment of the present invention.
Figure 12:
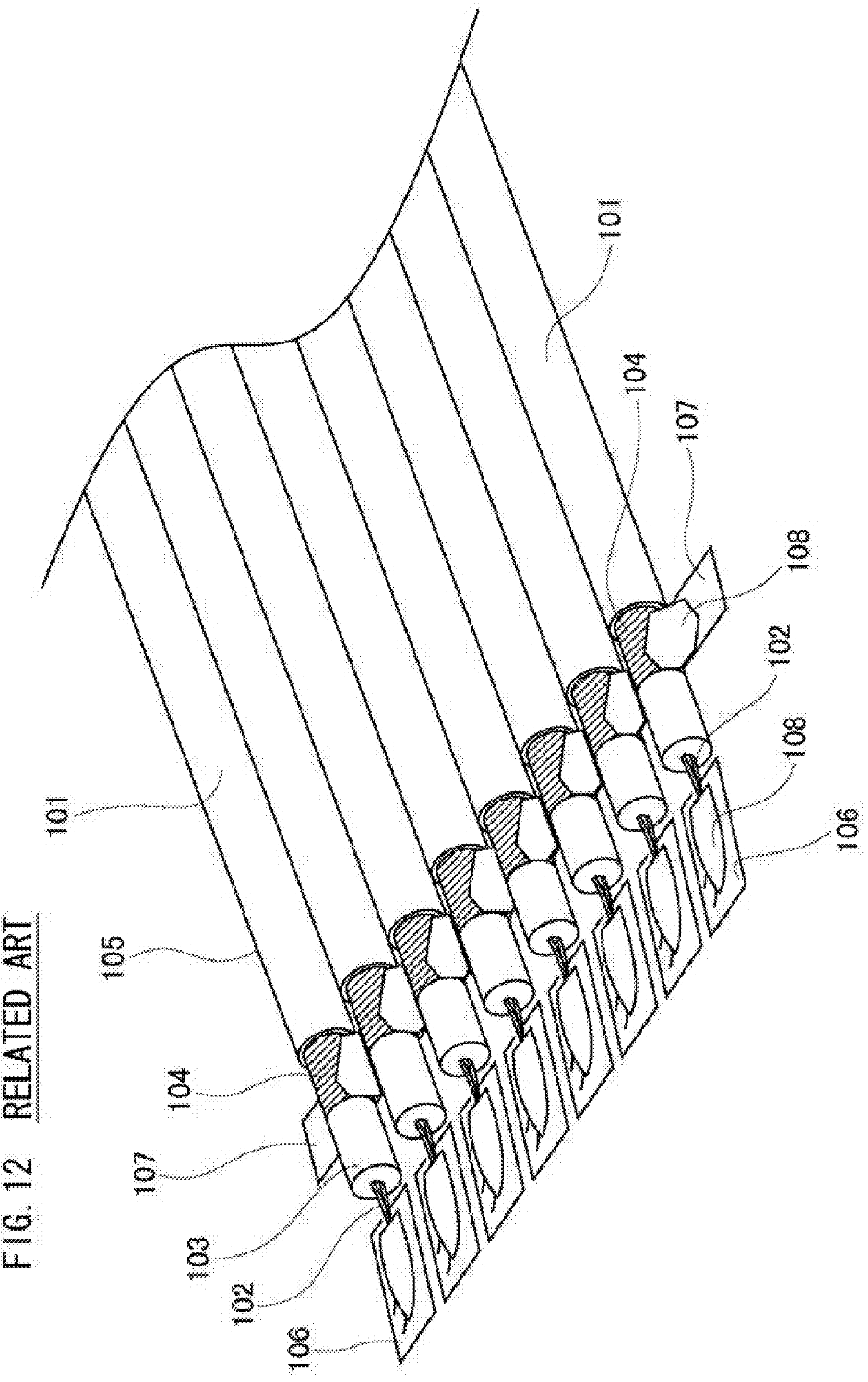
FIG. 12 RELATED ART
FIG. 12 is a perspective view illustrating a conventional connection structure between a plurality of coaxial cables and the printed board.

Note that as illustrated in FIG. 11, the inclined cross sections S3 of the coaxial cables 1 may be the cross sections from which the parts 1*b* including linear cross sections L of the coaxial cables 1 are removed. In the embodiment of FIG. 11, both sides of each linear cross section L are bent with a curvature radius R, and the linear cross section L and a part of the bent part of each coaxial cable 1 is subjected to cutting/grinding/polishing, to thereby form the inclined cross sections S3.

In addition, it may be also preferable that a jig including a bottom wall for closing the opening 74 of the frame body 71 of the aforementioned embodiment is formed, and on the side wall and the bottom wall of this jig, the concave parts having parallel grooves curved with prescribed curvature are formed, and the coaxial cables are arranged in parallel in these parallel grooves, then the coaxial cables are arranged in these parallel grooves in parallel, and the coaxial cables are bent along a curved surfaces of the parallel grooves to be fixed thereto, to thereby form the inclined cross sections, with the bent portions of the coaxial cables removed together with the jig. In the second embodiment, when the coaxial cables are bent along the curved surfaces of the parallel grooves and fixed thereto, the aforementioned pushing member 72 or a pressing member is used. However, the coaxial cables may be fixed by resin, etc, in a state of pressing the coaxial cables against the parallel grooves using the pressing member, etc, without providing the locking part 73 such as the one according to the second embodiment.

As is clarified from the above explanation, according to the aforementioned embodiment, one or a plurality of effects as described below can be obtained.

In addition, a strip work conventionally performed multiple numbers of times, for the end parts of the plurality of parallelly arranged coaxial cables, can be replaced with formation of the inclined cross sections by cutting operation of once or cutting/grinding/polishing operations. Therefore, the step of the connection work can be simplified.

Further, by not forming the connecting cross sections of the coaxial cables into the cross sections vertical to the length direction of the coaxial cables, but forming the connecting cross sections into the inclined cross sections, sectional areas/sectional shapes of the connection parts can be expanded, therefore allowable deviation amount of the positioning accuracy can be increased when the center conductors and the external conductors of the coaxial cables are directly connected to the wiring patterns of the inclined cross sections, and it is possible to cope with thinner diameter of the coaxial cable.

Further, direct connection is made between the inclined cross sections of the coaxial cables and the wiring pattern of the wiring board or the connector. Therefore, the formation area of the wiring pattern can be made small.

As described above, the present invention has been explained based on limited number of embodiments. However, the scope of the present invention is not limited to these embodiments. The scope of the present invention should be limited by claims, and various modifications of the aforementioned embodiments are included, within the scope of the claims and within the scope equivalent to the scope of the claims.

What is claimed is:

1. A multi-coaxial cable assembly, comprising:

a multi-coaxial cable in which a plurality of coaxial cables having insulators, external conductors, and jackets on the outer periphery of center conductors are in parallel arranged;

an end part of said multi-coaxial cable, the end part having a cross section formed at a position far from an end face of said multi-coaxial cable and formed in such a manner as exposing said center conductors and said external conductors for each said coaxial cable by removing a part including a curved part obtained by curving said multi-coaxial; and a wiring board or a connector having a wiring pattern to which said center conductors and said external conductors of said coaxial cables exposed on said cross sections are connected.

2. The multi-coaxial cable assembly according to claim 1, further comprising a jig on the end part of said multi-coaxial cable for fixing said plurality of coaxial cables in a state of being parallely arranged and bent.

3. The multi-coaxial cable assembly according to claim 1, wherein electrodes for ground lines and electrodes for signal lines are alternatively arranged in said wiring pattern, said center conductors are connected to said electrodes for signal lines, and two adjacent external conductors of said coaxial cables arranged in parallel are connected to one of said electrodes for ground lines.

4. The multi-coaxial cable assembly according to claim 3, wherein said electrodes for ground lines and said electrodes for signal lines have elongated shapes, with dimensions corresponding to an axial direction of said coaxial cables set to be larger than the dimension corresponding to a parallel direction of said coaxial cables arranged in parallel.

5. The multi-coaxial cable assembly according to claim 1, wherein said connection between said center conductors/said external conductors and said wiring pattern is direct contact.

6. A method for manufacturing a multi-coaxial cable assembly, comprising the steps of:

forming a curved part by curving an end part of a multi-coaxial cable in which a plurality of coaxial cables are arranged in parallel having insulators, external conductors, and jackets on an outer periphery of center conductors, removing a part of said multi-coaxial cable including said curved part, and forming cross sections at a position far from an end face of said multi-coaxial cable in such a manner as exposing said center conductors and said external conductors for each said coaxial cable; and connecting said center conductors and said external conductors of said coaxial cables exposed on said cross sections, to a wiring pattern formed on a wiring board or a connector.

7. The method according to claim 6, wherein the step of forming said cross sections comprises the steps of:

pushing the end part of said multi-coaxial cable into an opening of a jig for fixing cables in a state of parallely arranging said plurality of coaxial cables and bending said plurality of coaxial cables; and forming said cross sections by removing a part wherein said coaxial cables are bent and pushed-out from said opening of the jig.

8. The method according to claim 7, wherein said jig comprises:

a frame body having said opening, in which concave parts being guides for arranging said coaxial cables in parallel are formed on an inner peripheral surface of said opening; and a pushing member for pushing said coaxial cables into said opening, with a prescribed curvature.

9. The method according to claim 8, wherein said jig further comprises a locking part for locking said pushing member at the time of pushing said coaxial cables into said opening by said pushing member.

10. The method according to claim 8, wherein in the steps of pushing, said coaxial cables are fixed by resin in which said coaxial cables are pushed into said opening by said pushing member.

11. The method according to claim 6, wherein electrodes for ground lines and electrodes for signal lines are alternatively arranged in said wiring pattern; and in the step of making connection to said wiring pattern, said center conductors are connected to said electrodes for signal lines, and said adjacent two external conductors of said coaxial cables arranged in parallel are connected to one of said electrodes for ground lines.

12. The method according to claim 6, wherein said connection between said center conductors/said external conductors, and said wiring pattern is a direct connection which joins said center conductors/said external conductors and said wiring pattern by giving ultrasonic vibration while bringing said center conductors/said external conductors into contact with said wiring pattern and applying pressure thereto.

* * * * *